L. J. WARNER.
INKING ROLL TRUCK.
APPLICATION FILED SEPT. 10, 1920.

1,371,714.

Patented Mar. 15, 1921.

INVENTOR
Leroy J. Warner,
By Owen Owen & Crampton,
His attys.

UNITED STATES PATENT OFFICE.

LEROY J. WARNER, OF CHICAGO, ILLINOIS.

INKING-ROLL TRUCK.

1,371,714.   Specification of Letters Patent.   Patented Mar. 15, 1921.

Application filed September 10, 1920. Serial No. 409,454.

*To all whom it may concern:*

Be it known that I, LEROY J. WARNER, a citizen of the United States, and a resident of Chicago, in the county of Cook and State of Illinois, have made an Invention Appertaining to Inking-Roll Trucks; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to radially expansible rollers adapted more particularly for use as inking roll trucks.

The object of my invention is to improve on the construction of inking roll truck shown and described in my United States Letters Patent No. 1,350,127, dated August 17, 1920, whereby to enhance the efficiency, practicability and commercial value thereof.

The invention is fully described in the following specification, and while, in its broader aspect, it is capable of embodiment in numerous forms, a preferred embodiment thereof is illustrated in the accompanying drawings, in which,—

Figure 1:
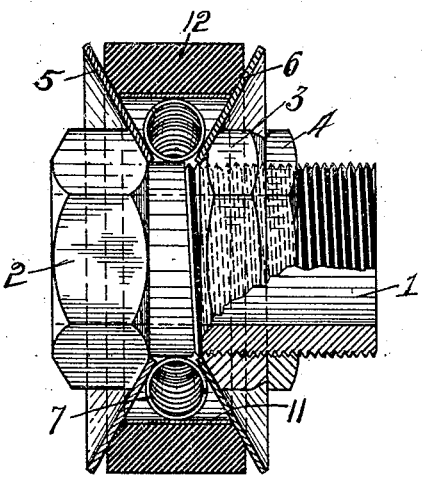
Figure 2:
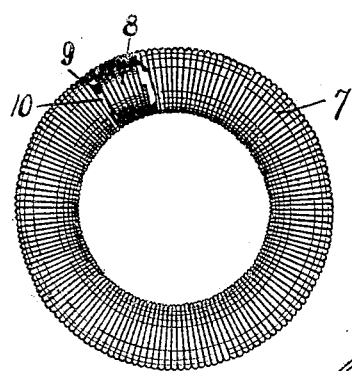
Figure 4:
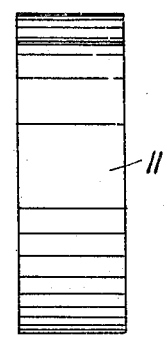
Figures 3, 5:
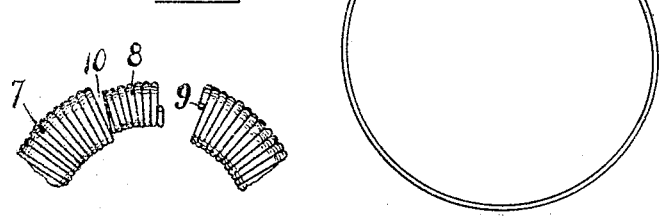

Figure 1 is a central longitudinal section of an inking roll truck embodying the invention, with parts in full. Fig. 2 is a side elevation of the spring expansion ring thereof, with a part broken away. Fig. 3 is a fragmentary side elevation of the expansion ring, with the adjacent ends of the spring coil separated, and Figs. 4 and 5 are different views of the expansible spring band.

Referring to the drawings, 1 designates the sleeve or hub member of a truck embodying the invention, which sleeve is intended to receive and be rigidly mounted on an end of an inking roll shaft. This sleeve is provided at one end with a head or enlargement 2, preferably having its circumference of hexagonal or other suitable form to facilitate gripping the same with a wrench. The opposite end of the sleeve is externally threaded a distance to permit the threading of a nut 3 and outer locking nut 4 thereon.

Two conical collars 5 and 6, preferably stamped from sheet metal, are mounted on the sleeve 1 between the head 2 and nut 3 with their conical faces opposing each other to form a V-shaped space therebetween which broadens outwardly from the sleeve. These collars are intended to bear outwardly at their inner edge portions against the respective inner edges of the head 2 and nut 3, which edges are of conical form to fit the conical concavities of the collars and form broadened bearings therefor.

A coiled spring wire is bent transversely of its longitudinal axis to form a radial expansible ring 7, and this is mounted on the sleeve 1 between the two collars 5 and 6 in side bearing contact with the conical faces thereof whereby a restriction of the space between the collars will cause a radial expansion of the ring. The ring normally is of a size to fit the sleeve. The ends of the spring coil are secured together by providing one end of the coil with a reduced nipple portion 8 for fitting into the socket in the other end of the coil, and the wire terminal of such other end is turned inward to form a spur 9 for insertion into a space 10 between the adjacent end convolutions of the ring body and nipple, as shown in Fig. 2.

Embracing the periphery of the spring 7 and expansible therewith is a circular split band 11, the ends of which overlap to allow for contraction and expansion. This band in cross-section extends substantially from face to face of the collars 5 and 6 and carries a tire or tread band 12 of rubber or other suitable elastic material on its outer side. The tread band is of considerable thickness to allow for considerable wear and compensating radial adjustment, and the collars 5 and 6 are of a depth to extend substantially to the periphery of the tread when the parts are in full contracted positions, as shown in Fig. 1. It is evident that to adjust the truck roller to increase its diameter, or to compensate for wear of the peripheral surface thereof it is only necessary to tighten the nut 3 to effect a relative inward adjustment of the conical collars 5 and 6, thereby causing a radial expansion of the spring ring 7, by reason of the contact of the conical surfaces of the collars therewith, and also a corresponding expansion of the bands 11 and 12. In other words, the coiled spring ring 7 takes the place of the balls 12 in my former patent. The use of this spring ring is of advantage in that it provides a unitary structure which is elastic in its nature to adapt it to contract under its own spring tension as well as to expand.

I wish it understood that my invention is not limited to any specific construction, arrangement or form of the parts, as it is capable of numerous modifications and changes without departing from the spirit of the claims.

Having thus described my invention, what I claim as new, and desire to secure by Letters Patent, is,—

1. An expansible roller having a pair of opposed conical surfaces relatively adjustable to vary the spacing therebetween, a coiled spring ring disposed between the faces concentric with the roller axis, and expansible tread means mounted on the ring and expansible by an expansion of the ring upon an inward adjustment of the conical faces and vice versa.

2. An expansible roller having a pair of collars with opposed conical faces, means carrying the collars and adjustable to relatively move the collars to vary the space therebetween, a radially expansible coiled spring ring disposed between the collars concentric therewith and in coaction with their conical faces, and expansible tread means mounted on the ring between the collars and expansible by an expansion of the ring.

3. An expansible roller having a pair of conical sheet metal collars, means carrying the collars and operable to relatively adjust the collars to vary the space therebetween, a coiled spring ring disposed between the collars and expansible by an inward relative adjustment of the collars, an expansible spring band resting on the outer side of the ring and expansible therewith, and an elastic tread band encircling the spring band.

4. An expansible roller comprising a pair of opposed conical collars, means carrying the collars and operable to relatively adjust the same to vary the space therebetween, a spring wire coil formed in ring shape with its ends connected together, said coil disposed between the collars in bearing contact with the conical faces thereof and expansible by an inward relative adjustment of the collars, and expansible tread means bearing inwardly on the ring between the collars and expansible with the ring.

In testimony whereof I have hereunto signed my name to this specification.

LEROY J. WARNER.